US008583773B2

(12) United States Patent
Pafumi et al.

(10) Patent No.: US 8,583,773 B2
(45) Date of Patent: Nov. 12, 2013

(54) AUTONOMOUS PRIMARY NODE ELECTION WITHIN A VIRTUAL INPUT/OUTPUT SERVER CLUSTER

(75) Inventors: James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/004,245

(22) Filed: Jan. 11, 2011

(65) Prior Publication Data

US 2012/0179798 A1 Jul. 12, 2012

(51) Int. Cl.
*G06F 15/173* (2006.01)

(52) U.S. Cl.
USPC ........... 709/223; 709/229; 709/209; 709/208; 709/220; 709/201

(58) Field of Classification Search
USPC .................. 709/201, 229, 208–211, 220–223
See application file for complete search history.

(56) References Cited

U.S. PATENT DOCUMENTS

| 6,363,416 B1* | 3/2002 | Naeimi et al. ................ 709/209 |
|---|---|---|
| 6,950,855 B2 | 9/2005 | Sampathkumar |
| 6,993,587 B1* | 1/2006 | Basani et al. ................. 709/229 |
| 7,392,421 B1 | 6/2008 | Bloomstein |
| 7,675,869 B1 | 3/2010 | Anker |
| 2002/0042693 A1* | 4/2002 | Kampe et al. ................ 702/186 |
| 2006/0123024 A1 | 6/2006 | Sathyanarayan |
| 2008/0189468 A1 | 8/2008 | Schmidt |
| 2008/0281938 A1 | 11/2008 | Rai |

* cited by examiner

*Primary Examiner* — Wing F Chan
*Assistant Examiner* — Padma Mundur
(74) *Attorney, Agent, or Firm* — Yudell Isidore Ng Russell PLLC

(57) ABSTRACT

In a data processing system having a plurality of virtual input/output servers (VIOSes) configured within a VIOS cluster, a method, data processing system and computer program product provide for autonomous election of a primary node within a virtual input/output server (VIOS) cluster. A first VIOS performs the functions of: detecting that a primary node is required for the VIOS cluster; and autonomously initiating an election process to elect a next primary node from among the VIOSes within the VIOS cluster. When the first VIOS meets the pre-established requirements for becoming a primary node, the first VIOS obtains a lock on a primary node ID field within a VIOS database (DB) and then initiates a primary node commit process to assign the first VIOS as the primary node. The first VIOS issues a notification to the VIOS cluster to notify the other VIOSes that a primary node has been elected.

21 Claims, 10 Drawing Sheets

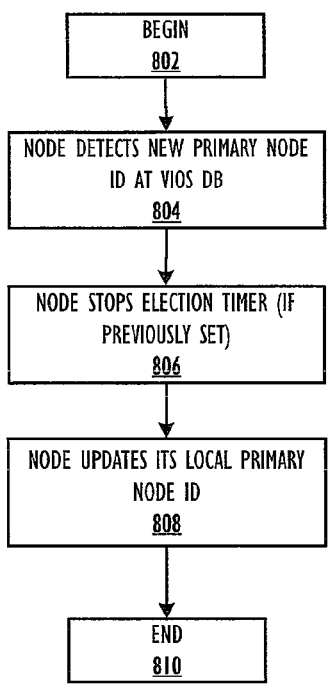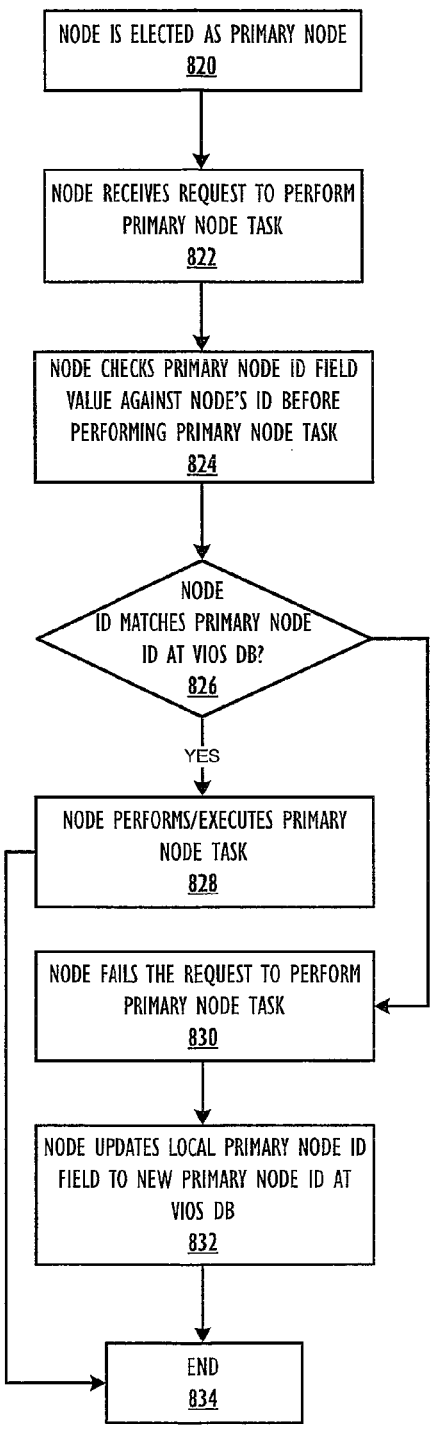

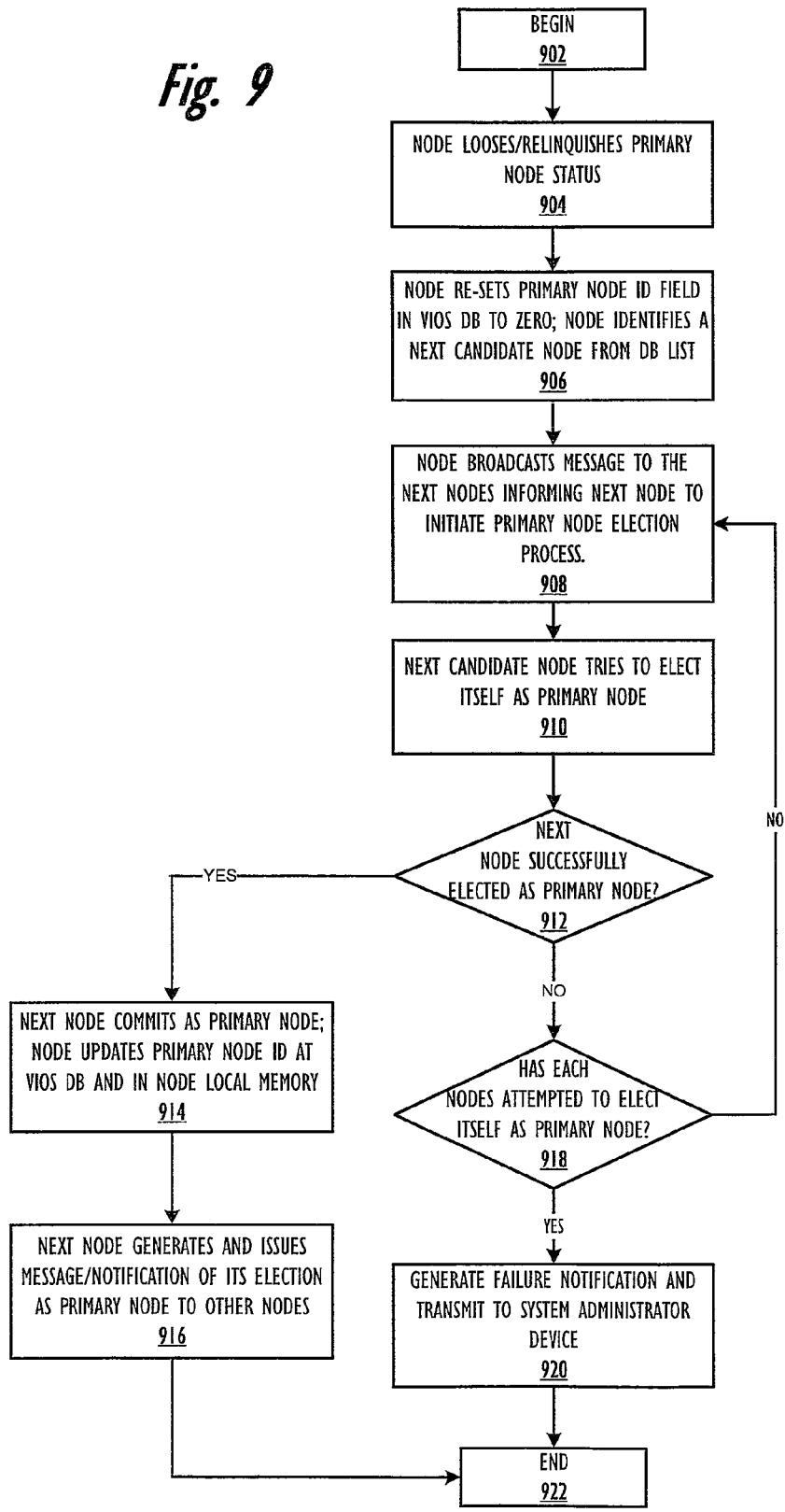

AUTONOMOUS PRIMARY NODE ELECTION WITHIN A VIRTUAL INPUT/OUTPUT SERVER CLUSTER

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product that enable election of primary nodes within a VIOS cluster.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. One important component within this storage virtualization model is the virtual input/output server (VIOS), which supports I/O operations for one or more clients within the distributed computer system. In a large scale distributed computer system, there can be a very large number of VIOSes individually providing access to different clients. With this configurations of separate VIOSes supporting separate clients, different client logical partitions (LPARs) associated with different virtualized server systems may access the same storage access network (SAN) storage. However, the client LPARs on one server do not have any "knowledge" of whether the SAN disk that the client LPAR is trying to access is being used by some other client LPAR belonging to the same server or another server. The conventional implementation of distributed server systems providing storage virtualization within shared SAN storage can cause data integrity issues and may potentially cause data corruption and client partition crashes.

BRIEF SUMMARY

Disclosed are a method, data processing system, and a computer program product that provide for autonomous election of a primary node within a virtual input/output server (VIOS) cluster. The method is performed in a data processing system having one or more computing electronic complexes (CECs) that comprise a plurality of VIOSes configured within a VIOS cluster, which has an associated VIOS database (DB) and in which each VIOS provides I/O resources to one or more logical partitions (LPARs) executing within the one or more CECs. A first VIOS of the VIOS cluster performs a method comprising: detecting that a primary node is required for the VIOS cluster; and autonomously initiating an election process to elect a next primary node from among one or more VIOSes within the VIOS cluster.

In one embodiment, the method further comprises: determining whether the first node meets one or more pre-established requirements to become a primary node by checking one or more configuration parameters of the first node against the one or more pre-established requirements for a node to become the primary node; and in response to the first node not meeting the pre-established requirements, activating a primary node discovery process which discovers and notifies a next node from within an elector list of a need for electing a primary node. The current node becomes the elector node if there is a next node that meets the pre-established requirements to be a candidate for election. Also, the method comprises: in response to the first node meeting the pre-established requirements, determining whether a primary node identifier (ID) field within the VIOS DB is locked by another node; in response to the primary node ID field being locked, setting a primary node election timer to track an elapsed time from when the first node made the attempt to become the primary node; and in response to the primary node ID field being unlocked: locking the Primary Node ID field within the VIOS DB; and initiating a primary node commit process to assign the first node as the primary node. In one implementation, the timer expires after a pre-set amount of time, and the expiration of the timer prior to another node being elected as the primary node triggers the first node to re-initiates an attempt to become the primary node.

In one embodiment, the initiating the primary node commit process comprises: sending a commit signal to the VIOS DB to update the primary node ID field with the unique ID of the first node; unlocking the Primary Node ID field following the update of primary node ID field with the unique ID of the first node; and issuing a notification message to all other nodes in the cluster to inform the other nodes that a new primary node has been elected.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein:

FIGS. 7, 8A, 8B and 9 are high level logical flowcharts of exemplary methods of electing and/or replacing a primary node of the VIOS cluster, according to one or more embodiments.

DETAILED DESCRIPTION

Figure 1A:
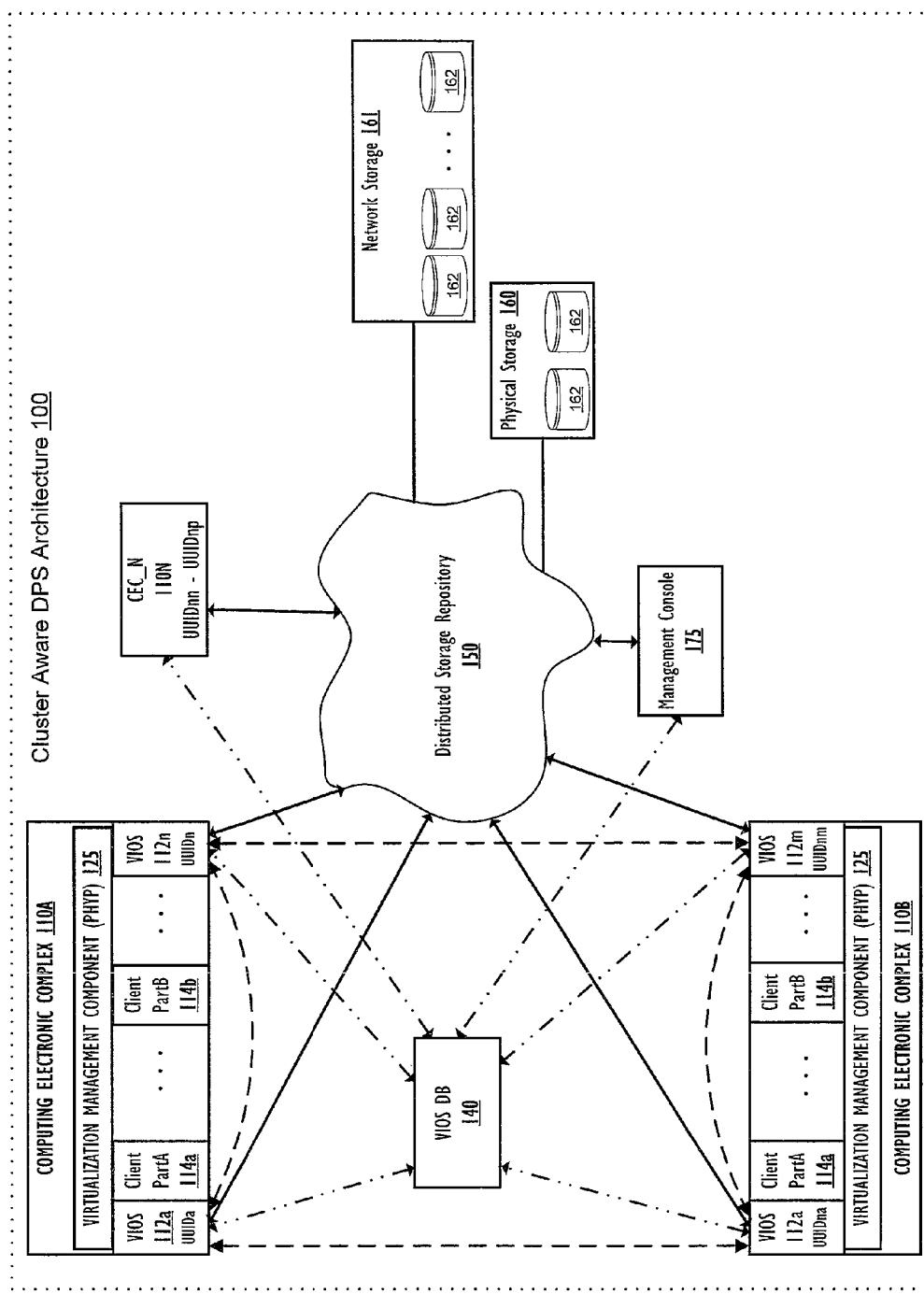
FIG. 1A illustrates a first view of a cluster (aware) data processing system within which various of the functional features of the described embodiments are implemented, according to one embodiment.

The illustrative embodiments provide a method, data processing system, and computer program product that provide for autonomous election of a primary node within a virtual input/output server (VIOS) cluster. The method is performed in a data processing system having one or more computing electronic complexes (CECs) that comprise a plurality of VIOSes configured within a VIOS cluster, which has an associated VIOS database (DB) and in which each VIOS provides I/O resources to one or more logical partitions (LPARs) executing within the one or more CECs. A first VIOS of the VIOS cluster performs a method comprising: detecting that a primary node is required for the VIOS cluster; and autonomously initiating an election process to elect a next primary node from among one or more VIOSes within the VIOS cluster.

In one embodiment, the method further comprises: determining whether the first node meets one or more pre-established requirements to become a primary node by checking one or more configuration parameters of the first node against the one or more pre-established requirements for a node to become the primary node; and in response to the first node not meeting the pre-established requirements, activating a primary node discovery process which discovers and notifies a next node from within an elector list of a need for electing a primary node. The current node becomes the elector node if there is a next node that meets the pre-established requirements to be a candidate for election. Also, the method comprises: in response to the first node meeting the pre-established requirements, determining whether a primary node identifier (ID) field within the VIOS DB is locked by another node; in response to the primary node ID field being locked, setting a primary node election timer to track an elapsed time from when the first node made the attempt to become the primary node; and in response to the primary node ID field being unlocked: locking the Primary Node ID field within the VIOS DB; and initiating a primary node commit process to assign the first node as the primary node. In one implementation, the timer expires after a pre-set amount of time, and the expiration of the timer prior to another node being elected as the primary node triggers the first node to re-initiates an attempt to become the primary node.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and sub-headings are presented within the specification:

A. General Architecture
   B. Cluster-Aware VIOS
   C. VIOS API Communication Infrastructure
   D. VIOS Shared DB for Cluster Management and Primary Node Election
   E. Autonomous Primary Node Election A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes" are assumed to refer specifically to a VIOS within the cluster. DPS 100 also comprises a management console 175 on which a management tool (not shown) executes.

Figure 1B:
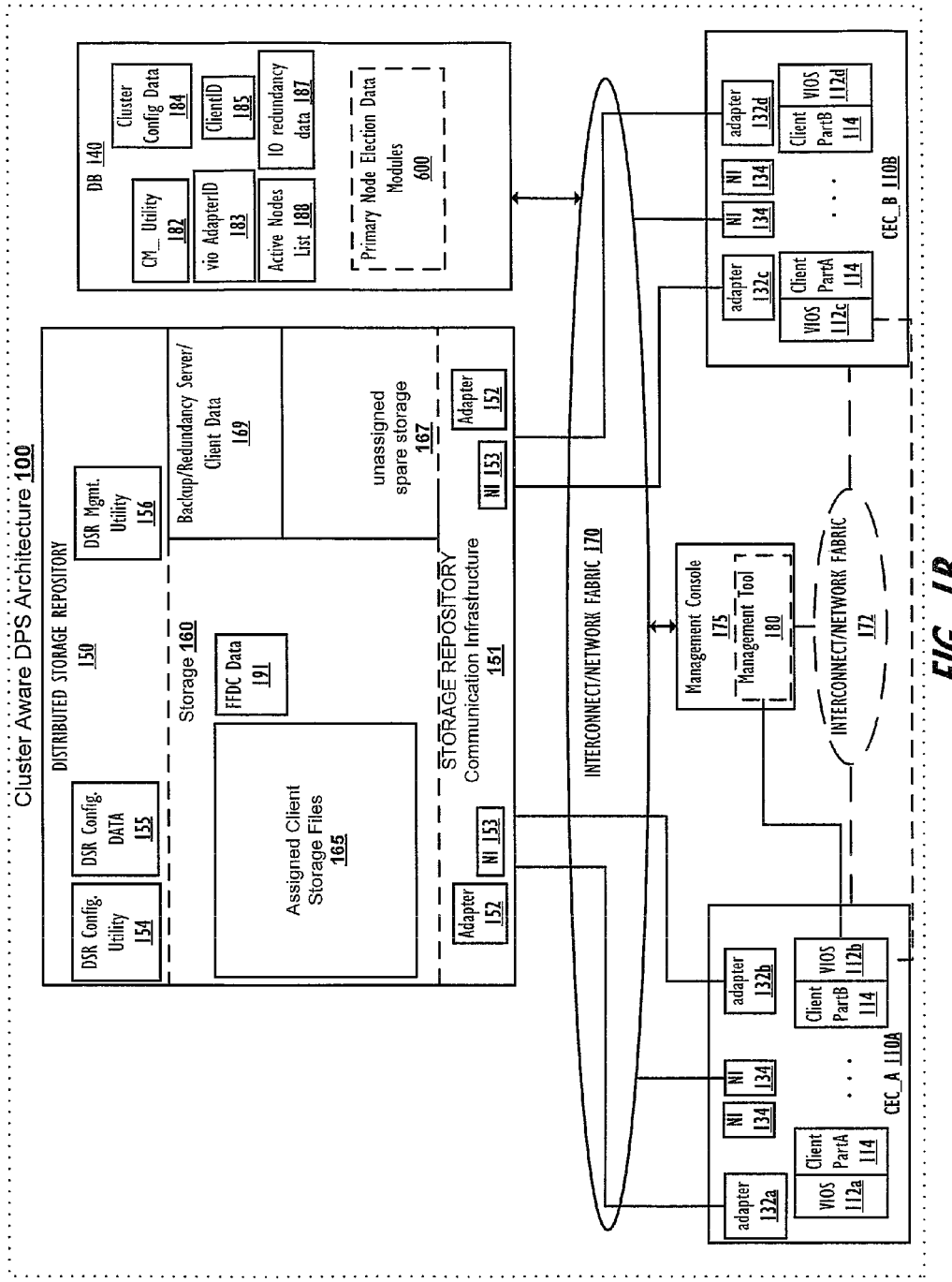
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of several of the functional and other components provided within an example distributed storage repository 150 and an initial listing of some components of VIOS DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to VIOS DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110. As further shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). VIOS DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. Additionally, VIOS DB 140 comprises primary node election data modules 600, which are a plurality of different functional components and data that are utilized during an election of a primary node (VIOS) from among the various nodes in the VIOS cluster. The actual makeup of primary node election data modules 600 is described in detail with the description of FIG. 6 presented below. These various components support the various clustering functionality and cluster-aware I/O operations of the one or more VIOSes 112, as described herein. Additional features of VIOS DB 140 and distributed storage repository 150 as well as the specific components or sub-components that enable the various clustering functionality are presented within the description of the remaining figures and throughout the description of the various embodiments.

Figure 3:
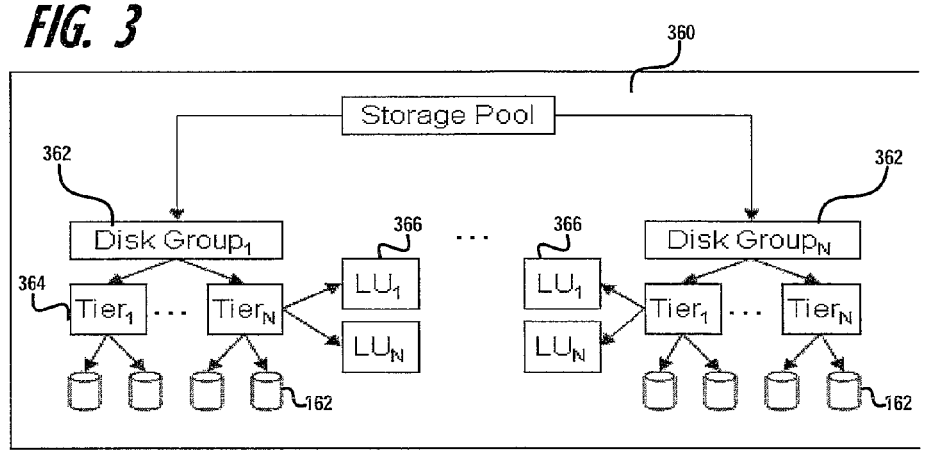
FIG. 3 illustrates an example shared storage pool of a distributed storage repository utilized for storage I/O functions of the VIOSes, according to one embodiment.

FIG. 3 illustrates an example configuration of a storage pool utilized to provide the I/O storage capability of distributed storage repository 150 within a cluster aware DPS 100. Specifically, FIG. 3 provides details on how these physical volumes are used within the storage pool. As shown, storage pool 360 within the cluster contains one or more Disk Groups 362. Disks Groups 362 provide administrators the ability to provide access policies to a given subset of physical volumes 162 within the storage pool 360. Once a disk group 362 has been defined, administrators can further categorize the subset into Storage Tiers 364 based on disk characteristics. Once a Disk Group 362 and Storage Tier 364 have been defined, administrators carve Logical Units (LU) 366 to be exported to client partitions (114).

In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 of FIG. 1A-1B and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls some of the operations of the VIOS cluster and may enable each node within the cluster to maintain current/updated information regarding the cluster, including providing notification of any changes made to one or more of the nodes within the cluster.

Figure 2:
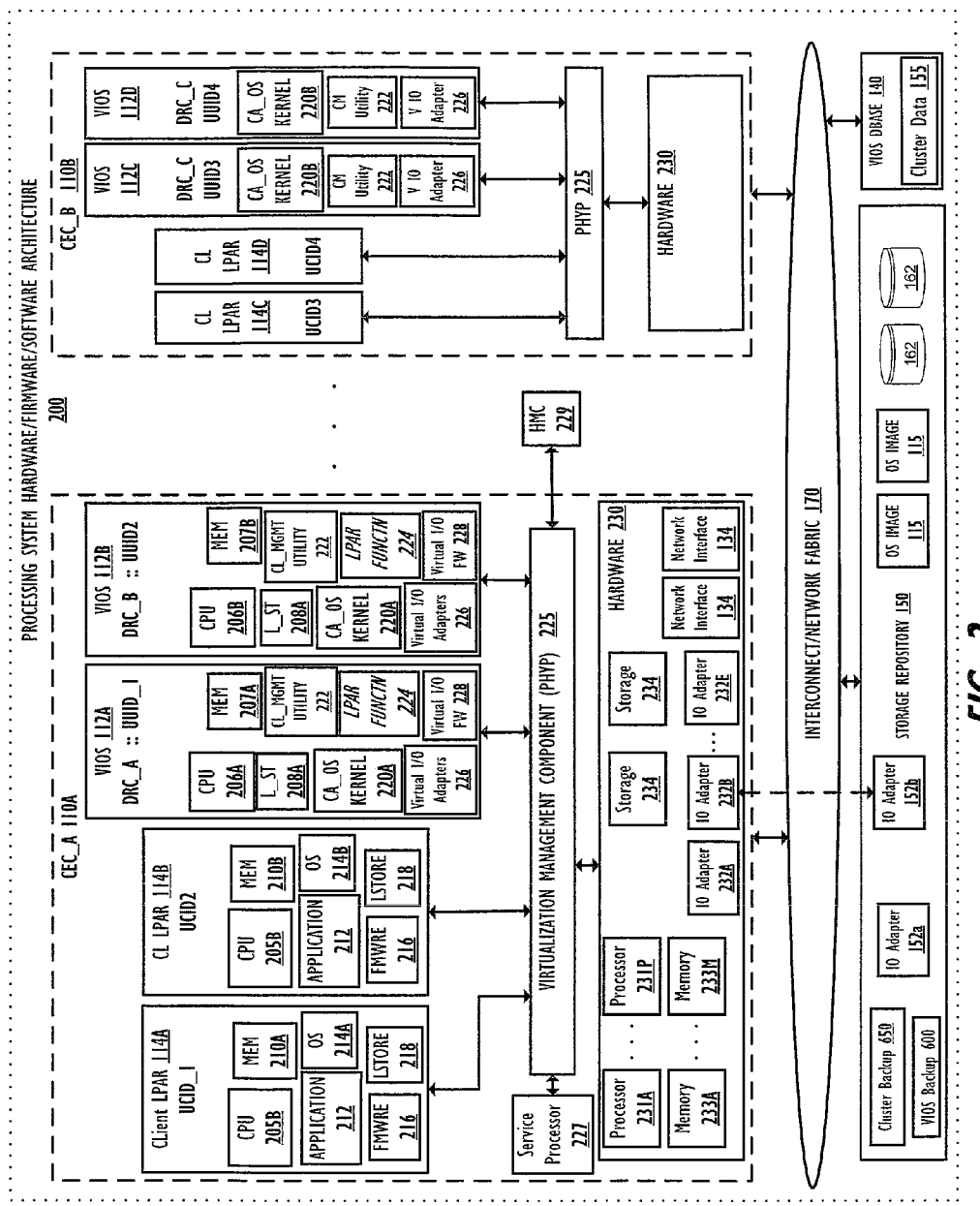
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system (s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 5:
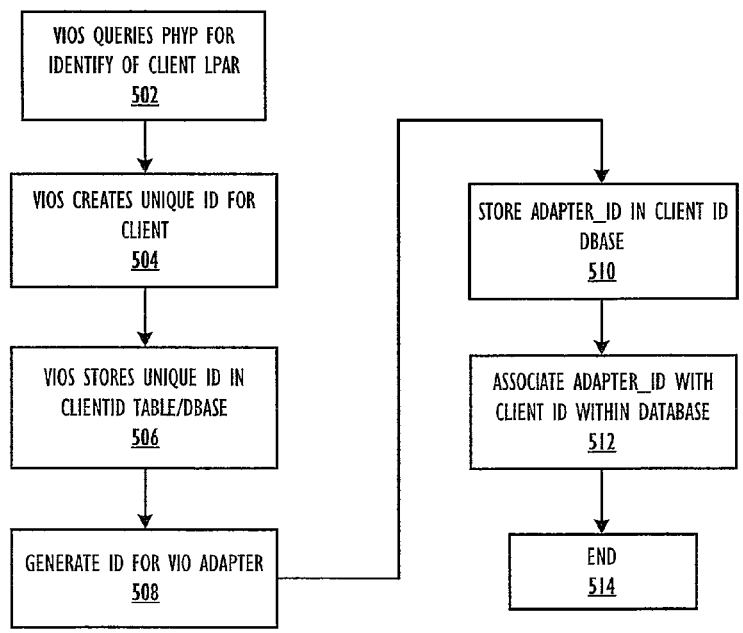
FIG. 5 is a high-level logical flowchart illustrating the method of registering a cluster-aware VIOS with the VIOS DB and VIOS cluster, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 5 is a flow chart illustrating the method by which a VIOS 112 on a CEC 110 with DPS 100 enables cluster level communication between a client LPAR 114 and distributed storage repository 150, according to one embodiment. The process begins at block 502 at which the VIOS 112 queries PHYP 225 for the identity of the client LPAR 114. At block 504, the VIOS 112 creates a unique identifier (ID) for the client (i.e., a ClientID). The VIOS 112 then stores the unique ClientID in ClientID data structure 159 (FIG. 1B) within DB 140 (block 506). The DB 140 and by extension the ClientID data structure 159 are accessible to each VIOS partition in the cooperating cluster (DPS 100). At block 508, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 510) and are associated with their corresponding clientIDs (block 512). The method illustrated by FIG. 5 ends at termination block 514, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Protocol

One embodiment provides a communication protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4:
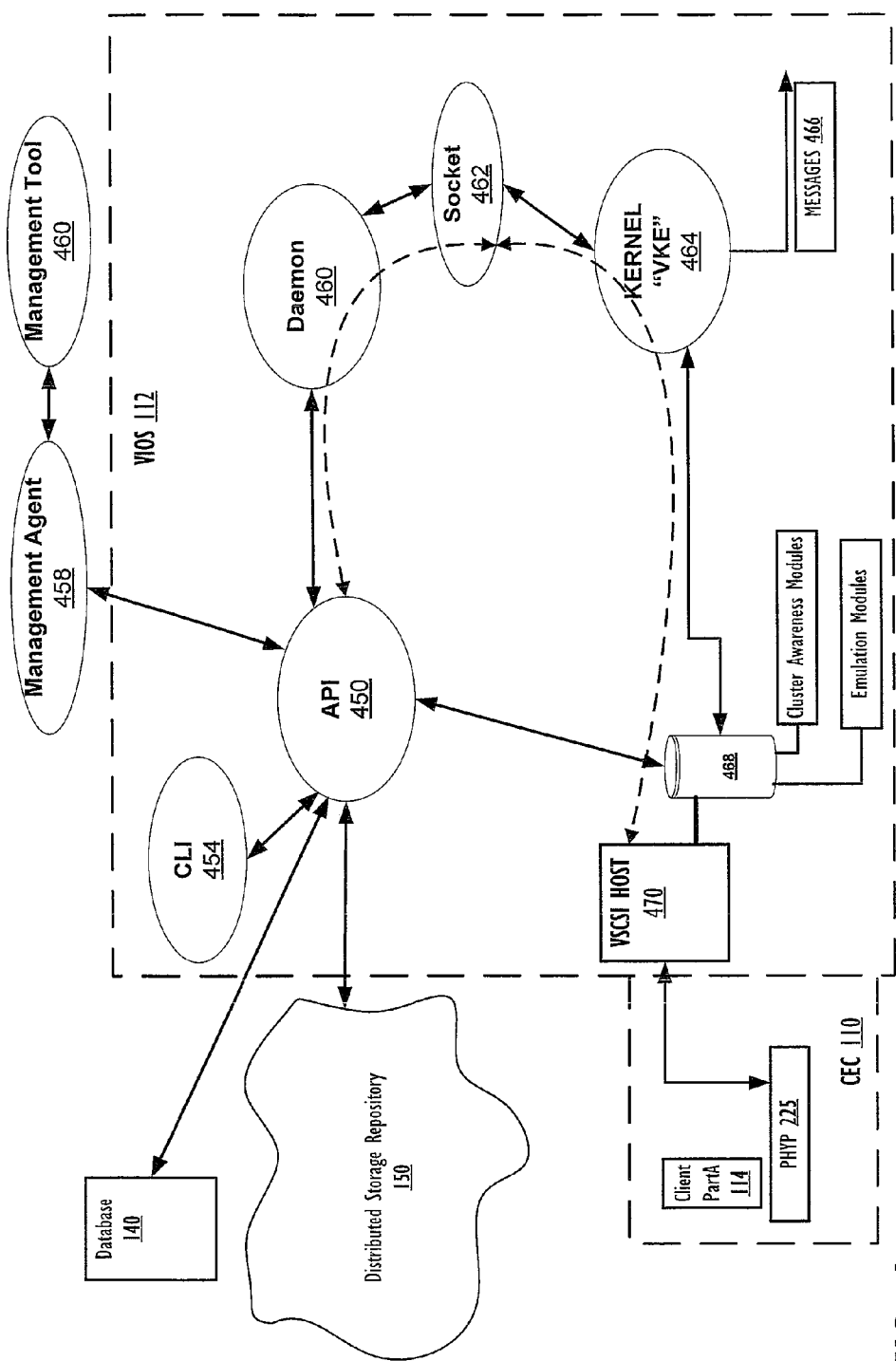
FIG. 4 illustrates a VIOS communication infrastructure with an application programming interface (API) controlling messaging and communication of VIOS components and other devices within the DPS, according to one embodiment.

Referring now to FIG. 4, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 252 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 260 is implemented within a cluster aware server module and includes server management sub-agents 258, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a request or a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure4 coupled to VSCSI host 470. Structure 468 includes software modules that enable the various messaging structures used for implementing VIOS cluster awareness functionality and VIOS/Client emulation. Client 114a logs into the VIOS 112 as part of the transport layer protocol. At the time the client 114a logs into the VIOS 112, the PHYP 125 provides information to the VIOS 112 regarding the identity (ID) of the client 114a relative to the CEC 110. The VKE 264 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

D. VIOS Shared DB for Cluster Management and Primary Node Election

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

Figure 6A:
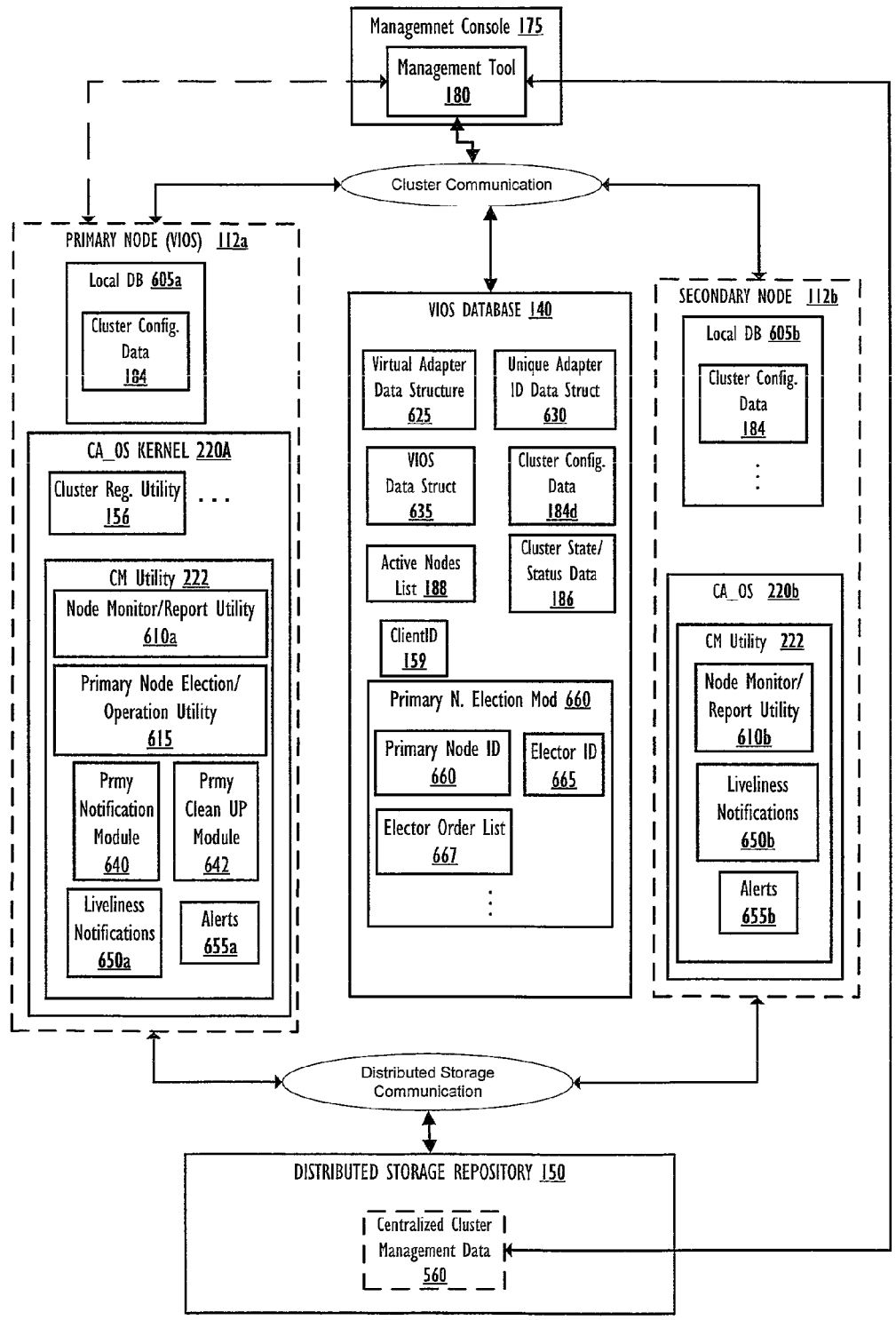
FIG. 6A is a block diagram representation of stored data structures and other functional components within a VIOS DB and a primary node and secondary node to perform autonomous primary node election processes, according to one embodiment.

FIG. 6A is a block diagram representation of functional components of a primary node, a secondary node and shared storage (VIOS DB 140) to enable cluster level information/data storage, management and exchange between the various nodes and VIOS DB 140. In one embodiment, a local copy of (relevant data of) VIOS DB 140 (such as cluster configuration data 184) is shared by each VIOS (node) within the VIOS cluster and stored in respective local DB 605a, 605b. Each VIOS 112 is then responsible for storing, maintaining and updating the data structures at DB 140 and in their respective local DBs 605. As illustrated by FIG. 6, VIOS DB 140 is accessible to the various VIOSes 112 (which are interchangeably referred to herein as nodes) and to management tool 180 within management console 175 via cluster communication fabric. VIOS DB 140 comprises several different modules of data, which may be arranged in a plurality of formats (e.g., tables, raw data, sequenced data, etc.). According to the figure, DB 140 includes a virtual adapter data structure 525, which maintains a listing of and configuration information about the virtual adapters. DB 140 also includes a second data structure 530 that holds the unique adapter identifiers (AdapterIDs), and is therefore referred to herein as AdapterID data structure 530. DB 140 maintains a listing of and information about the individual VIOSes within a VIOS data structure 535. In one or more embodiments, each of the described data structures 525-535 can be or can include a table within DB 140. When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. When a VIOS 112 is first configured, the VIOS downloads from DB 140 a copy of cluster configuration data 184d and cluster state/status data 186 from VIOS DB 140. VIOS DB also maintains an active nodes list 188, which includes all VIOSes that are functional within the VIOS cluster. VIOS DB 140 may comprise a plurality of additional data structures and/or components, some of which are illustrated within VIOS DB 140 and described below.

E. Autonomous Primary Node Election

Due to the potentially large number of VIOSes within the VIOS cluster, one or more embodiments provide a mechanism/methodology for managing events and actions within the system. According to one embodiment, a system and method are provided by which the various nodes within the VIOS cluster detect when there is a need for a primary node, elect a primary node, and subsequently trigger another election of a next primary node when needed. With this embodiment, the election process involves utilizing VIOS DB 140 and the message passing functionality enabled by the VIOS cluster to ensure that whenever possible there is a primary node assigned to maintain and provide cluster information about the nodes within the cluster and to the nodes. In the following descriptions, references made to a specific Primary Node will be directed to VIOS 112A of FIG. 2A. One or more of VIOS 112B or VIOS 112C then represents the secondary nodes described within the following description.

Referring again to FIG. 6A, VIOS DB 140 comprises a plurality of functional structures/modules and/or data associated with the primary node election process described herein. As shown, VIOS DB 140 comprises primary node ID 660 and elector ID 665, both of which provides specific functions defined hereafter. Additionally, each VIOS comprises a plurality of components that supports the primary node/secondary node configuration of a VIOS cluster. As provided, within CA_OS kernel 220 of each VIOS 112 is cluster registration utility 156 and CM utility 222. CM utility 222 then comprises node monitor/report utility 610, liveliness notifications 650 and alerts 655. When a VIOS is configured to operate as a primary node, that VIOS also comprises primary node election/operation utility 615 and either or both primary notification module 640 and primary clean up module 642. As further presented by FIG. 6B, VIOS DB 140 may also comprise alert journal 670, Message/Alert notification subscriber list 672 and clean up data module 674.

Figure 6B:
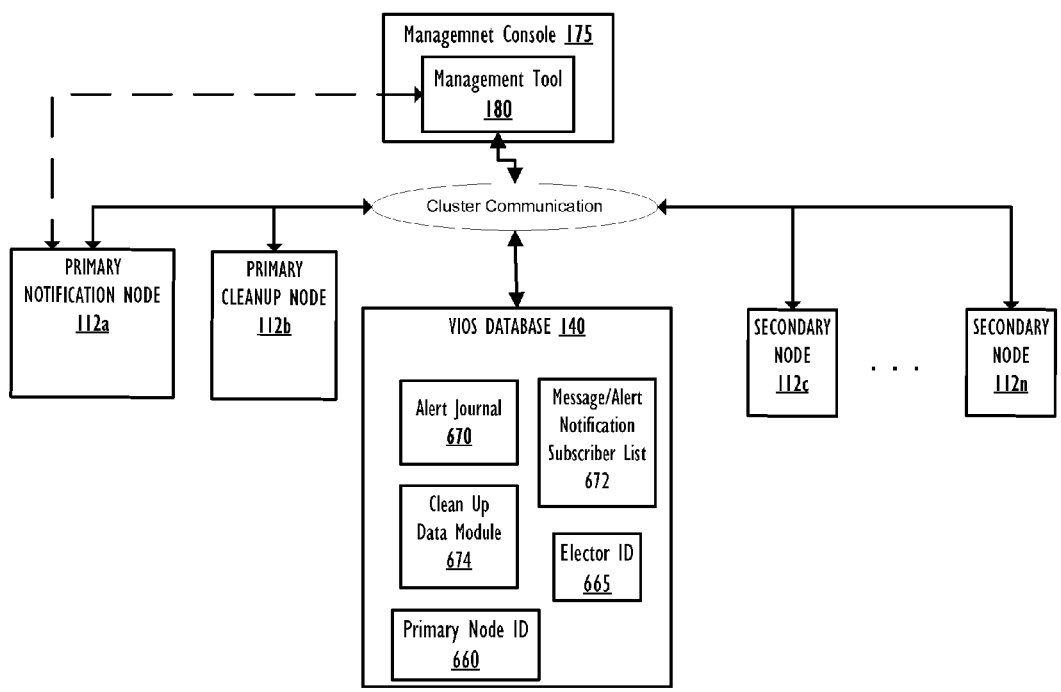
FIG. 6B is a block diagram representation of a VIOS cluster having multiple primary nodes with different functionality, according to one embodiment.

Utilization of a primary node provides a benefit of scalability for cluster environments in large configurations. According to one embodiment, the VIOS cluster environment incorporates role specific VIOS nodes that provide services to other VIOS nodes in the cluster. Among the roles (and associated functionality) that are provided by one or more VIOS nodes are the roles of: posting life cycle events; posting alerts; journaling alerts; and providing Database and general clean up, among others. In one embodiment, each role can be performed by a separate primary node, such that an unlimited number of primary nodes may be defined within the cluster. The number of primary nodes can be based on the functionality needed, and each function could, in one or more embodiments, have a separate primary node assigned to perform that particular function. According to the illustrative embodiment, and as illustrated by FIG. 6B, the above roles are provided by two primary nodes, Primary Notification node 112a and Primary Clean-up node 112b. Each node that is elected to the role of primary node first meets specific pre-established requirements. Assigning a VIOS the role of primary node is provided through an election process, which is generally illustrated by the flow charts of FIGS. 7-9.

Figure 7:
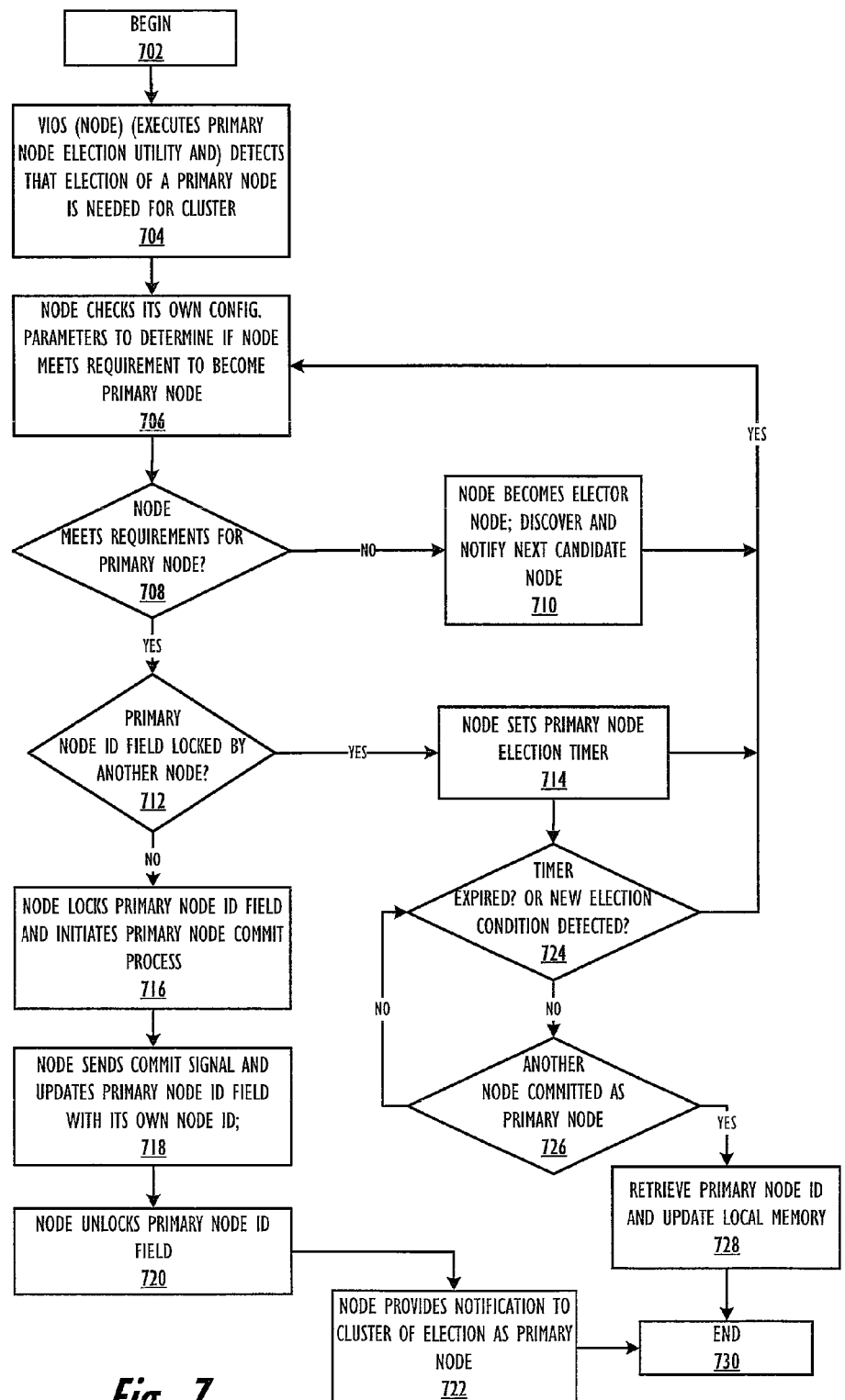

Turning now to FIG. 7, the method of the primary node election process begins at block 702. In the presented embodiment, a first VIOS/node detects that a primary node election is needed and the first node initiates the election process. When the node detects (block 704) that an election is needed, the node checks its own configuration parameters against the requirements published for a node to become the primary node (block 706). The node determines at decision block 708 whether the node itself meets the requirements (e.g., by having a pre-established set of primary node modules/data configuration) to allow the node to become the primary node. If the node does not meet the established requirements, the node becomes the elector node and activates a discovery process that discovers and notifies a next node (e.g., from within the elector order list 667) of the need for a primary node (710). The next node may then become the candidate node if the next node meets the requirements to become a candidate. When the node meets the established requirements (block 708), the node determines at block 512 whether the primary node ID field is locked in the VIOS DB 140 by another node. If the primary node ID field is locked, the node sets a primary node election timer (block 714) to track the elapsed time since the node last attempted to become the primary node. The timer expires after an amount of time (e.g., a pre-set time period elapses) that is either a design choice or dynamically determined based on the number of nodes within the cluster and/or other quantifiable factors (step 724). Assuming that no other node has locked the primary node ID field, the node locks the Primary Node ID field 185 within VIOS DB 140 and the node initiates the primary node commit process (block 716). At block 718, the node sends a COMMIT signal to VIOS DB 140 and updates the primary node ID field with the node's own unique ID. The node then unlocks the Primary Node ID field 185 (block 720). In one embodiment, the features of block 710 are performed as a part of the COMMIT process of block 712.

When the established primary node prepares to take any "primary node specific" actions, the primary node first generates and issues a query to VIOS DB 140 to ensure that the node is (still) the primary node before the node takes the action (block 722). For example, before the primary notification node posts a life cycle event (LCE), the node will issue a query to VIOS DB 140 (and specifically to check the value of the Primary Node ID stored within the Primary Node ID field 660) to confirm that the node is still the Notification Primary Node (i.e., checking that the node's ID matches that stored as the Primary Node ID). Returning to decision block 724, a check is made at block 726 whether another node has committed as the primary node. If another node has committed as the primary, the node retrieves the primary node ID from the primary node ID field and updates the node's local copy of the primary node ID (block 728). The method process then ends at block 730.

According to the protocol for electing a primary node, if the Primary Node ID field is locked, then all other nodes that attempt to read the primary node ID field 185 will receive a busy return value. When the node receives the "busy" response, the node sets an election timer. If during the election process the current elector node determines that the node does not meet the one or more requirements to be a primary node, the elector node performs the task of discovering a next candidate. First, the elector node retrieves the list of active nodes 188 in the cluster. The elector node then communicates with the next active node in the list 188, starting with the next entry after the elector node's own entry in the list 188. Receipt of this communication prompts the next node in the list 188 to begin the election process. The election process in completed one node at a time, until a suitable primary node is elected.

In one or more embodiments, the elector node sends a message to the candidate node to determine if the candidate node is capable of becoming the primary node. If the candidate node is capable it elects itself as the primary node for the specified role. If the message to the candidate node fails to be received and/or acknowledged, then the elector node repeats the process for the next node in the ordered list 188. When a primary node no longer meets the requirements to be a primary node, the node undertakes the process or relinquishing the primary role. The process involves the primary node updating the Primary Node ID in VIOS DB 140 to a null/zero value and discovering the next candidate in the ordered list 188, as previously described.

Referring to FIG. 8A, which begins at block 802, when a next node is selected as the primary, the current node performs a series of additional processes. The node first detects (or receives a message notification) at block 804 that there is a new primary node ID within the primary node ID field 660 at the VIOS DB 140. The node immediately stops its election timer (where a timer was previously set) at block 806. The node then updates its local primary node ID that is maintained in local storage with the primary node ID retrieved from the VIOS DB (block 808).

FIG. 8B illustrates the method by which a primary node first confirms its primary node status before performing a requested primary node function. According to the described embodiments, whenever a primary node undertakes to perform one of the primary node tasks, the new primary node first checks the current value of the primary node ID field 660 against the locally stored value of primary node ID (which should be the node's ID if the node is still the primary node). The method process begins at block 820 at which a node is elected as a primary node. The (previously elected primary) node receives a request to perform or initiate a primary node function/task (block 822). Before performing the primary node task, the node first accesses the VIOS DB 140 and checks the current value of the primary node ID field within the VIOS DB 140 against the node's unique ID (block 824). The node determines (block 826) if the primary node ID within the VIOS DB 140 matches (or is) the node's unique ID. In response to the primary node ID at the VIOS DB matching the node's unique ID, the node performs or initiates the requested primary node task/function (block 828). However, in response to the primary node ID within the VIIOS DB 140 not matching the node's unique ID (e.g., by being a null/zero value or by being set to the ID of another node within the cluster), the node fails the request and does not perform/initiate the primary node task (block 830). The node then updates the primary node ID within the node's local storage (block 832). The process then ends at block 834.

In one or more embodiments, as illustrated by the method of FIG. 9, when a node that is the primary node no longer meets the requirements to be the primary node, the node resets the primary node ID within the VIOS DB 140 to a null/zero value. The node also sends a message to inform the other nodes in the cluster to initiate the election process. In one embodiment, the current primary node informs the other nodes of the need for electing a new primary node by the current primary node updating the primary node ID in the VIOS DB 140 to a zero/null value and then broadcasting a primary node election message so that the other nodes that meet one or more primary node criteria can initiate the election process. In an embodiment where different primary nodes can be elected to perform different roles and/or embodiments in which certain nodes can only perform certain primary roles, the broadcasted message includes indentifying information about the primary role that is being relinquished (e.g., a notification role, a cleanup role).

As introduced above, during the primary node election process, the non-elector nodes (i.e., the nodes that do not currently have a lock on the primary node ID field 660) monitors the elapsed time of the election process by initiating their respective timers. The timer is started by a node when the node receives a primary node election start message and/or when the node receives a busy value when trying to read the Primary Node ID from VIOS DB 140. The timer is stopped by the node when a new elected primary can be detected. If no new primary is detected, then the node initiates the election process at the expiration of the timer to attempt to become the primary node.

With the method of FIG. 7, if the node has started a timer during the election process, the node must first query the value of the Primary Node ID from the VIOS DB 140 and the node must then determine if the Primary Node ID at the VIOS DB 140 is the same as the primary node ID stored in the node local memory. In one embodiment, the node also checks if the Elector Node ID 187 is set. If the Elector Node ID 187 is not set, the node assumes that the previous elector has been unable to complete the election, and the node sets the Elector Node ID and initiates an election process. If the Primary Node ID from VIOS DB 140 is different than the primary node ID stored in node local memory or the Elector ID 187 is 0, the node establishes itself as the elector node and sets the node's unique ID as the new Elector ID. Also, when a recent primary node receives a notification or response indicating that the node is no longer the primary node, the node will automatically update the node's internal value of the primary node ID to the new primary node ID retrieved from VIOS DB (block 716). The node also stops the election timer, if one was initiated. With the above confirmation step performed prior to any node undertaking a primary node task, there is no need for the node to receive an election success or confirmation message in response to a commitment signal.

FIG. 9 illustrates the method by which certain of these described features are implemented. The method begins at block 902 and proceeds to block 904 at which the current (or previous) primary node loses or relinquishes the primary node status. The node resets the primary node ID field to zero and checks the elector node list in the VIOS DB 150 to identify a next candidate node from an ordered listing of candidate nodes (block 906). The node broadcasts a message to the next candidate node informing the next nodes that the next node can initiate the primary node election process (block 908). In one embodiment, the node forwards a single message (rather than a general broadcast) to the specific second/next node that is next on the list of elector/candidate nodes stored within the VIOS DB 140. Then, the next node attempts to elect itself as the primary node (block 910). At decision block 912, a determination is made whether the next node was successful at electing itself as the primary node (e.g., detection of the successful election can be achieved by the previous primary node receiving a new primary node message within (or before expiration of) a pre-established time frame). In response to the next node being successful in electing itself as the primary node, the next node commits as the primary node and updates the primary node ID at the VIOS DB 140 and in the node's local storage (block 914). The next node then generates and issues a notification/message to inform the other nodes that the next node has been successfully elected as the primary node (block 916). In the illustrated embodiment, the other candidate nodes can be individually selected in sequence for elector node status based on the elector node list maintained within the VIOS DB 140. Thus, in response to the next node not being able to elect itself as the primary node, a determination is made at decision block 918 whether each of the candidate nodes identified on the elector node list have attempted to elect itself as the primary node. When there are still other nodes that have not yet attempted to elect themselves as the primary node, the process returns to block 908 at which a next (third, fourth, etc) node is selected as the elector node to attempt to elect itself as the primary node. Thus, when a current elector node does not meet the conditions to become the primary node or fails in its attempt to become the primary node, that elector node calls the next node within the elector node list. However, in response to all nodes within the elector node list failing in their respective attempts to elect itself as the primary node, the CM utility of one of the nodes (e.g., the last primary node or the last elector node) generates a failure notification and transmits the notification to a system administrator terminal/device (block 926). The process then ends at block 922.

During an election of a Primary Event Node, when a socket connection (e.g., TCP socket, UNIX socket, etc.) to the required callers does not exist, the node sends a registration message/request to a defined UNIX socket for the caller to register a socket. Also, during the election process any LCE that arrives at VIOS DB 140 will be lost. Then, following its election as the primary node, the node that wins the election process issues a resend/re-synchronize message to the caller (s) whose LCE was lost during the primary node election process.

Once the primary node is elected, the primary node undertakes to perform several tasks/functions dependent on the services the primary node provides. An example of these tasks/functions are a notification function by which the primary node broadcasts an election complete message with an election success status, including the primary node's ID and primary node role (e.g., notification or/and cleanup role), to the other VIOSes within the cluster. This broadcast is only performed by the newly elected primary node. Each non-primary (secondary) node that receives this message updates the node's local memory with the new Primary Node ID, and the non-primary node also stops any election timing the node may have initiated. Another task/function performed by the newly elected primary node involves taking role specific actions. Specifically, a Primary Notification Node issues the caller resynchronization message/request to the caller on the socket after the election completion message is returned. This resynchronization notification is needed because any events that occur during the election process may be lost. Also, the Primary notification node listens to and posts Alerts. The Primary Cleanup Node performs the tasks of: gathering the active node list and take actions based on inactive nodes; cleaning up database entries; performing clean up based on journal entries (future); and listens to and journals alerts. Once a primary node is elected, the non-primary nodes automatically stop their respective election process timers and load the new Primary Node ID into their respective node local memory. In one embodiment, the Primary Notification node reads the journaled alerts and posts all alerts that occurred during the election process to management tools.

When the primary node election process fails to result in a primary node being elected, the election process is tagged as failed and the cluster management utility 222 generates and issues a notification to the management console 175. This failure only occurs when the process has exhausted the entire elector order list 667 without finding a suitable primary node. In one embodiment, the original elector node ID is saved in VIOS DB 140 and can be checked to verify that the list 667 has been exhausted. Generating an indication of a failure of the election process involves clearing the elector ID field 665 in VIOS DB 140. The elector node logs an error to indicate that services provided by the primary role are not available at the current time. Non-primary nodes then clear the Primary Node ID from their respective local memories, which coincides with the individual nodes also checking whether the node meets the requirements for the primary node role, in order to re-initiate the election process. The presence of a Primary Node ID of zero at the node indicates that the primary node has not been elected.

According to the described embodiments, one or more triggers initiate the primary node election process when there is no primary node elected or the present primary node cannot fulfill the primary node role. Among these triggers are those presented within the following non-exclusive list:

(1) The primary node is no longer part of the VIOS cluster. The VIOS cluster alert functionality provides notification if a node is removed from the VIOS cluster;

(2) The primary node is no longer part of the VIOS DB cluster. The cluster DB (DB 140) alerts must be listened to by all nodes, and only the primary node forwards these alerts. If an alert is received by a non-primary node, the non-primary node checks the Primary Node ID 186, and if the Primary Node ID 186 is 0, the node initiates the election process;

(3) The primary node no longer meets the requirements for the primary role. As an example, the Primary Notification node may lose socket connectivity to required callers;

(4) An action taken by a node causes that node to meet the requirements for the primary role. As an example, the Primary Notification node has the socket connection from required callers registered;

(5) A non-primary node detects failures while requesting services from the primary node;

(6) A non-primary node detects that there is no primary node elected after a start or restart of the VIO daemon. When the system is in a state where no primary node has been elected (e.g., at system startup or following an election failure), the start or restart of the VIO daemon forces the VIO daemon to load the Primary Node ID into the local memory. If the Primary Node ID is zero, then the local node initiates the election process.

Election of a Primary Notification Node also occurs in response to the following conditions:

(1) When a LCE event or alert is received by a node, the daemon checks if there is a primary node. If there is currently no primary node, then the VIO daemon initiates the election process; and (2) When a caller registers a socket for event notification, the VIO daemon checks if there is a Primary Notification Node, and the VIO daemon initiates the election process if there is no primary notification node.

Whenever a primary node or an elector node goes down (is no longer functional), the alert handler starts re-election of the respective primary node. Also, if the election timer expires, which may indicate that the cluster heartbeat may have a problem, the election process is restarted. With each election restart, the node first compares what the node last recorded as the primary node ID with the Primary Node ID in VIOS DB 140.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer program product having a computer readable medium containing computer readable/program code/instructions such that a series of steps are performed when the computer readable/program code/instructions are executed (by a processing unit/processor) on a computing device/machine. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having one or more computing electronic complexes (CECs) that comprise a plurality of virtual input/output (I/O) servers (VIOSes) configured within a VIOS cluster, which has an associated VIOS database (DB) and in which each VIOS provides I/O resources to one or more logical partitions (LPARs) executing within the one or more CECs, a first VIOS of the VIOS cluster executing code on a processing resource to perform a method comprising:

the first VIOS of the VIOS cluster detecting that a primary node is required for the VIOS cluster, wherein the first VIOS is a first node; and autonomously initiating an election process to elect a next primary node from among one or more VIOSes within the VIOS cluster;

the first node determining whether it meets a plurality of pre-established requirements to become a primary node by checking a plurality of configuration parameters of the first node against the plurality of pre-established requirements for a node to become the primary node;

in response to the first node not meeting the plurality of pre-established requirements, activating a primary node discovery process which discovers and notifies a next node from within an elector list of a need to elect a primary node;

wherein the first node becomes an elector node if there is a next node that meets the pre-established requirements to be a candidate for election;

in response to the first node meeting the plurality of pre-established requirements, determining whether a primary node identifier (ID) field within the VIOS DB is locked by another node, wherein the primary node ID field within the VIOS DB contains the unique ID of the primary node;

in response to the primary node ID field being locked, setting a primary node election timer to track an elapsed time from when the first node made the attempt to become the primary node, wherein the timer expires after a pre-set amount of time, and wherein an expiration of the timer prior to another node being elected as the primary node triggers the first node to re-initiate an attempt to become the primary node; and in response to the primary node ID field being unlocked:
locking the primary node ID field within the VIOS DB; and
initiating a primary node commit process to assign the first node as the primary node by: sending a commit signal to the VIOS DB to update the primary node ID field with a unique ID of the first node; in response to an updating of the primary node ID field with the unique ID of the first node, unlocking the primary node ID field; and issuing a notification message to all other nodes in the cluster to inform the other nodes that a new primary node has been elected.

2. The method of claim 1, further comprising:
determining that performance of a function/action by the primary node is required;
issuing a query to the VIOS DB to determine whether the first node is still the primary node by checking a current value of the primary node ID field; and
performing the function/action by the first node only if the first node is still the primary node.

3. The method of claim 2, further comprising:
in response to the first node no longer being the primary node, determining whether another node has committed as the primary node; and in response to another node having committed as the primary node:
retrieving the primary node ID from the primary node ID field; and
updating a local copy of the primary node ID field within the first node.

4. The method of claim 1, wherein activating the primary node discovery process further comprises:
retrieving a list of active nodes in the VIOS cluster;
communicating, with a next active node in the list of active nodes, the need to elect a primary node; and
in response to detecting that a next node is elected as the primary node:
stopping the election timer; and
updating a local copy of the primary node ID field that is maintained in local storage.

5. The method of claim 4, further comprising, in response to none of the active nodes being able to be elected as the primary node, issuing a notification of a failure to elect a primary node from among the active nodes within the cluster.

6. The method of claim 1, further comprising:
determining that the first node no longer meets the plurality of pre-established requirements to be the primary node;
in response to determining the first node no longer meets the plurality of pre-established requirements to be the primary node, relinquishing the primary node responsibility of the first node by updating the primary node ID field in the VIOS DB to a null value; and
discovering and notifying a next candidate node in the list of active nodes by performing one or more of:
directly messaging the next candidate node; and
broadcasting a primary node election message to other nodes, wherein at least one node of the other nodes that meets the plurality of pre-established requirements to become a primary node can initiate the election process.

7. The method of claim 6, wherein:
each different primary node performs a different role;
the broadcasted election message comprises identifying information about a primary role being relinquished by the first node;
a role of the primary node is that of a specific VIOS operating as one of: a primary notification node and a primary clean-up node;
the primary node is further configured to provide one or more services to other VIOSes within the VIOS cluster from among: posting life cycle events, posting alerts, journaling alerts, and providing database and general clean up;
a role is provided by at least one primary node; and
a single primary node can provide a plurality of roles.

8. The method of claim 1, wherein the VIOS DB comprises an elector node identifier (ID), the method further comprising:
checking whether an elector node ID is set in the VIOS DB; and
in response to the elector node ID not being set:
setting the elector node ID to the unique ID of the first node; and
initiating the election process.

9. A computer program product comprising:
a machine readable storage device; and
program code on the computer readable storage device that when executed by a processor of a first virtual input/output server within a VIOS cluster comprised of a plurality of VIOSes and a VIOS database (DB) and where the plurality of VIOSes provide I/O resources to one or more logical partitions (LPARs), causes the first VIOS to perform the functions of:

detecting that a primary node is required for the VIOS cluster;

autonomously initiating an election process to elect a next primary node from among one or more VIOSes within the VIOS cluster; and determining whether the first node meets a plurality of pre-established requirements to become a primary node by checking a plurality of configuration parameters of the first node against the plurality of pre-established requirements for a node to become the primary node, wherein the first VIOS is the first node;

in response to the first node not meeting the plurality of pre-established requirements, activating a primary node discovery process which discovers and notifies a next node from within an elector list of a need to elect a primary node;

wherein the first node becomes an elector node if there is a next node that meets the pre-established requirements to be a candidate for election;

in response to the first node meeting the plurality of pre-established requirements, determining whether a primary node identifier (ID) field within the VIOS DB is locked by another node, wherein the primary node ID field within the VIOS DB contains the unique ID of the primary node;

in response to the primary node ID field being locked, setting a primary node election timer to track an elapsed time from when the first node made the attempt to become the primary node, wherein the timer expires after a pre-set amount of time, and wherein an expiration of the timer prior to another node being elected as the primary node triggers the first node to re-initiate an attempt to become the primary node; and in response to the primary node ID field being unlocked:
locking the primary node ID field within the VIOS DB; and initiating a primary node commit process to assign the first node as the primary node by: sending a commit signal to the VIOS DB to update the primary node ID field with a unique ID of the first node; in response to an updating of the primary node ID field with the unique ID of the first node, unlocking the primary node ID field; and issuing a notification message to all other nodes in the cluster to inform the other nodes that a new primary node has been elected.

10. The computer program product of claim 9, further comprising program instructions that execute to perform the functions of:

determining that performance of a function/action by the primary node is required;

issuing a query to the VIOS DB to determine whether the first node is still the primary node by checking a current value of the primary node ID field; and performing the function/action by the first node only if the first node is still the primary node.

11. The computer program product of claim 10, further comprising program instructions that execute to perform the functions of:

in response to the first node no longer being the primary node, determining whether another node has committed as the primary node; and in response to another node having committed as the primary node: retrieving the primary node ID from the primary node ID field; and updating a node local copy of the primary node ID field within the first node.

12. The computer program product of claim 9, wherein the function of activating a primary node discovery process further comprises:

retrieving a list of active nodes in the VIOS cluster;

communicating, with a next active node in the list of active nodes, the need to elect a primary node; and in response to detecting that a next node is elected as the primary node:
stopping the election timer; and updating a local copy of the primary node ID field that is maintained in local storage.

13. The computer program product of claim 12, further comprising program instructions that execute to perform the functions of: in response to none of the active nodes being able to be elected as the primary node, issuing a notification of a failure to elect a primary node from among the active nodes within the cluster.

14. The computer program product of claim 9, further comprising program instructions that execute to perform the functions of:

determining that the first node no longer meets the plurality of pre-established requirements to be the primary node;

in response to determining the first node no longer meets the plurality of pre-established requirements to be the primary node, relinquishing the primary node responsibility of the first node by updating the primary node ID field in the VIOS DB to a null value; and discovering and notifying a next candidate node in the list of active nodes by performing one or more of:
directly messaging the next candidate node; and
broadcasting a primary node election message to other nodes, wherein at least one node of the other nodes that meets the plurality of pre-established requirements to become a primary node can initiate the election process.

15. The computer program product of claim 14, wherein:
each different primary node performs a different role;
the broadcasted election message comprises identifying information about a primary role being relinquished by the first node;
a role of the primary node is that of a specific VIOS operating as one of: a primary notification node and a primary clean-up node;
the primary node is further configured to provide one or more services to other VIOSes within the VIOS cluster from among: posting life cycle events, posting alerts, journaling alerts, and providing database and general clean up;
a role is provided by at least one primary node; and
a single primary node can provide a plurality of roles.

16. The computer program product of claim 9, wherein the VIOS DB comprises an elector node identifier (ID), the program instructions further comprising program instructions that execute to perform the functions of:

checking whether an elector node ID is set in the VIOS DB; and in response to the elector node ID not being set:
setting the elector node ID to the unique ID of the first node; and
initiating the election process.

17. A data processing system comprising:
one or more processors providing processing resources;
one or more memories coupled to the one or more processors;

a cluster-aware (CA) operating system (OS) which generates a first virtual input/output server (VIOS) that is communicatively couple to other VIOSes and to a VIOS database (DB) to create a VISO cluster, wherein the CA_OS comprises a utility executing on a processing resource of the first VIOS, which utility causes the first VIOS to perform the functions of:

detecting that a primary node is required for the VIOS cluster;

autonomously initiating an election process to elect a next primary node from among one or more VIOSes within the VIOS cluster;

determining whether a first node from among one or more VIOSes within the VIOS cluster meets a plurality of pre-established requirements to become a primary node by checking a plurality of configuration parameters of the first node against the plurality of pre-established requirements for a node to become the primary node, wherein the first VIOS is a first node;

in response to the first node not meeting the plurality of pre-established requirements, activating a primary node discovery process which discovers and notifies a next node from within an elector list of a need to elect a primary node, wherein the first node becomes an elector node if there is a next node that meets the pre-established requirements to be a candidate for election;

in response to the first node meeting the plurality of pre-established requirements, determining whether a primary node identifier (ID) field within the VIOS DB is locked by another node, wherein the primary node ID field within the VIOS DB contains a unique ID of the primary node;

in response to the primary node ID field being locked, setting a primary node election timer to track an elapsed time from when the first node made the attempt to become the primary node, wherein the timer expires after a pre-set amount of time, and wherein an expiration of the timer prior to another node being elected as the primary node triggers the first node to re-initiate an attempt to become the primary node; and in response to the primary node ID field being unlocked:
locking the primary node ID field within the VIOS DB; and
initiating a primary node commit process to assign the first node as the primary node.

18. The data processing system of claim 17, wherein the function of initiating the primary node commit process further comprises:

checking whether an elector node ID is set in the VIOS DB;
in response to the elector node ID not being set, setting the elector node ID to the unique ID of the first node;
sending a commit signal to the VIOS DB to update the primary node ID field with the unique ID of the first node;
in response to an updating of the primary node ID field with the unique ID of the first node, unlocking the primary node ID field; and
issuing a notification message to all other nodes in the cluster to inform the other nodes that a new primary node has been elected.

19. The data processing system of claim 17, the utility further executes to cause the first VIOS to perform the functions of:

determining that performance of a function/action by the primary node is required;

issuing a query to the VIOS DB to determine whether the first node is still the primary node by checking a current value of the primary node ID field;

performing the function/action by the first node only if the first node is still the primary node;

in response to the first node no longer being the primary node, determining whether another node has committed as the primary node; and in response to another node having committed as the primary node:
retrieving the primary node ID from the primary node ID field; and
updating a local copy of the primary node ID field within the first node.

20. The data processing system of claim 17, the utility further executes to cause the first VIOS to perform the functions of:

determining that the first node no longer meets the plurality of pre-established requirements to be the primary node;

in response to determining the first node no longer meets the plurality of pre-established requirements to be the primary node, relinquishing the primary node responsibility of the first node by updating the primary node ID field in the VIOS DB to a null value; and retrieving a list of active nodes in the VIOS cluster;

communicating, with a next active node in the list of active nodes, the need to elect a primary node;

discovering and notifying a next candidate node in the list of active nodes by performing one or more of:
directly messaging the next candidate node; and
broadcasting a primary node election message to other nodes, wherein at least one node of the other nodes that meets the plurality of pre-established requirements to become a primary node can initiate the election process;

in response to detecting that a next node is elected as the primary node:
stopping the election timer; and
updating a local copy of the primary node ID field that is maintained in local storage; and in response to none of the active nodes being able to be elected as the primary node, issuing a notification of a failure to elect a primary node from among the active nodes within the cluster.

21. The data processing system of claim 17, wherein:

each different primary node performs a different role;
the broadcasted election message comprises identifying information about a primary role being relinquished by the first node;
a role of the primary node is that of a specific VIOS operating as one of: a primary notification node and a primary clean-up node;
the primary node is further configured to provide one or more services to other VIOSes within the VIOS cluster, from among: posting life cycle events, posting alerts, journaling alerts, and providing database and general clean up;
a role is provided by at least one primary node; and
a single primary node can provide a plurality of roles.

* * * * *